US011770366B2

(12) United States Patent
Rodriguez

(10) Patent No.: US 11,770,366 B2
(45) Date of Patent: Sep. 26, 2023

(54) BLOCKCHAIN AUTONOMOUS AGENTS

(71) Applicant: Yoti Holding Limited, London (GB)

(72) Inventor: Francisco Angel Garcia Rodriguez, London (GB)

(73) Assignee: YOTI HOLDING LIMITED, London (GB)

( * ) Notice: Subject to any disclaimer, the term of this patent is extended or adjusted under 35 U.S.C. 154(b) by 393 days.

(21) Appl. No.: 17/268,917

(22) PCT Filed: Aug. 14, 2019

(86) PCT No.: PCT/EP2019/071875
§ 371 (c)(1),
(2) Date: Feb. 16, 2021

(87) PCT Pub. No.: WO2020/035544
PCT Pub. Date: Feb. 20, 2020

(65) Prior Publication Data
US 2021/0314305 A1    Oct. 7, 2021

(30) Foreign Application Priority Data

Aug. 17, 2018 (GB) ...................................... 1813458
Aug. 31, 2018 (GB) ...................................... 1814169

(51) Int. Cl.
*H04L 29/06* (2006.01)
*H04L 9/40* (2022.01)
(Continued)

(52) U.S. Cl.
CPC ........ *H04L 63/0407* (2013.01); *H04L 9/0637* (2013.01); *H04L 63/0861* (2013.01); *H04L 9/50* (2022.05)

(58) Field of Classification Search
CPC ............... H04L 63/0407; H04L 9/0637; H04L 63/0861; H04L 9/50; H04L 9/3231;
(Continued)

(56) References Cited

U.S. PATENT DOCUMENTS 9,992,022 B1    6/2018 Chapman et al.
2019/0156000 A1*  5/2019 Hoffmann ............. H04L 9/3234
(Continued)

FOREIGN PATENT DOCUMENTS

WO    WO 2020/035544 A1    2/2020

OTHER PUBLICATIONS

Dr Christian Lundkvist et al., Uport: A Platform For Self-Sovereign Identity Draft Version, Oct. 10, 2016, Retrieved on Sep. 16, 2019 from the Internet: http://blockchainlab.com/pdf/uPort_whitepaper_DRAFT20161020.pdf, 17 pages.
International Search Report for PCT Application No. PCT/EP2019/071875 dated Sep. 23, 2019, 12 pages.
International Preliminary Report on Patentability for PCT Application No. PCT/EP2019/071875 dated Feb. 23, 2021, 7 pages.
(Continued)

*Primary Examiner* — Mahfuzur Rahman
(74) *Attorney, Agent, or Firm* — Knobbe, Martens, Olson & Bear, LLP

(57) ABSTRACT

A method of associating user identity with an autonomous agent embodied on a blockchain stored in a blockchain network, the method comprising the following steps: a user engaging in a user authentication process to obtain a set of one or more verified identity attributes of the user; computing an identity hash, by applying a hash function to input data comprising the set of verified identity attributes; and sending to the blockchain network a data package comprising the identity hash and an identifier of the autonomous agent; wherein the autonomous agent is embodied on the blockchain as program code and at least one associated state register for storing associated program state, and wherein the data package causes at least a portion of the autonomous agent's program code to be executed on a node of the
(Continued)

blockchain network, which upon execution stores the identity hash in the at least one state register of the autonomous agent.

20 Claims, 9 Drawing Sheets

(51) Int. Cl.
  *H04L 9/06* (2006.01)
  *H04L 9/00* (2022.01)

(58) Field of Classification Search
  CPC ..... H04L 9/3239; H04L 63/08; H04L 67/306; G06F 21/31
  See application file for complete search history.

(56) References Cited

U.S. PATENT DOCUMENTS

| | | | |
|---|---|---|---|
| 2019/0163896 A1* | 5/2019 | Balaraman | H04L 63/0815 |
| 2019/0199534 A1* | 6/2019 | Beaman | B64D 1/00 |
| 2021/0314305 A1* | 10/2021 | Rodriguez | H04L 63/08 |
| 2023/0137650 A1* | 5/2023 | DiMaria | H04L 67/306 |
| | | | 379/209.01 |

OTHER PUBLICATIONS

Liu Yaoqing et al., Enabling Secure and Privacy Preserving Identity Management via Smart Contract, 2019 IEEE Conference on Communications and Network Security (CNS), IEEE, Jun. 10, 2019, 8 Pages.

Liu Yuan et al., An Identity Management System Based on Blockchain, 2017 15th Annual Conference on Privacy, Security and Trust (PST), IEEE, Aug. 28, 2017, 10 pages.

* cited by examiner

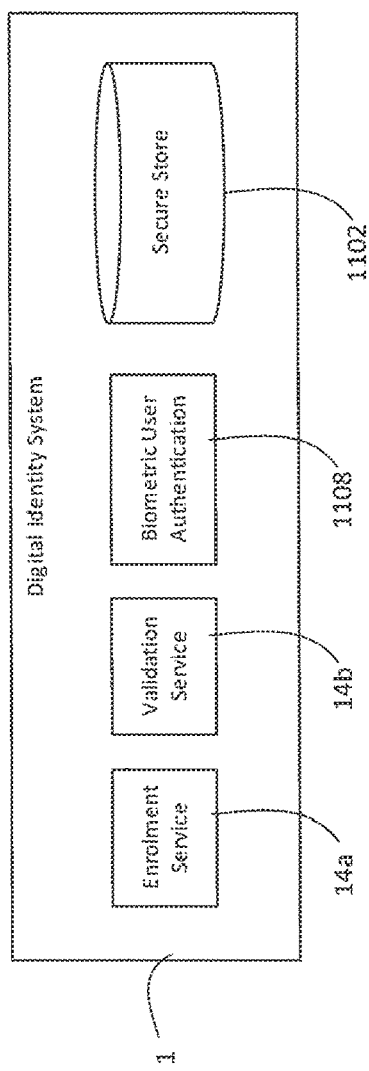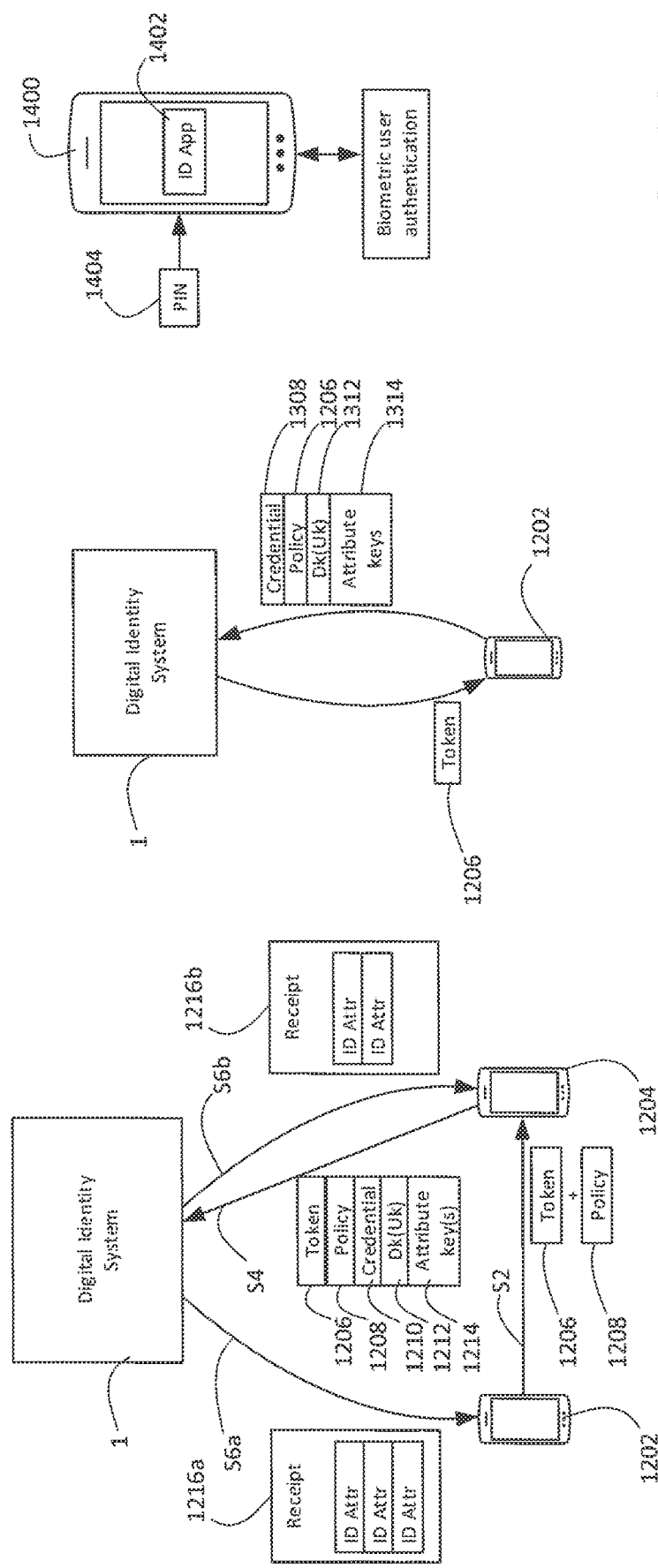

BLOCKCHAIN AUTONOMOUS AGENTS

TECHNICAL FIELD

This disclosure relates to blockchain technology, and to autonomous blockchain agents in particular.

BACKGROUND

A blockchain may be stored in a blockchain network in a distributed manner. The blockchain network may operate according to a distributed consensus protocol, which is used to reach a consensus, within the blockchain network, on the state of the blockchain, without any reliance on trusted entities. Some blockchain network are able to support autonomous agents, which are executed as part of the process of verifying and updating the blockchain in response to valid blockchain transactions.

SUMMARY

The present invention allows verified identity data to be attached to a blockchain smart contract in an anonymized fashion. Blockchain transactions are inherently anonymous, in that the only identities that are inherent to a blockchain are public addresses (derived from public encryption keys). The invention allows identity data to be reliably and immutably associated with a smart contract, but in a way that does not make a user's "real-world" identity publically visible on the blockchain.

A first aspect of the invention provides a method of associating user identity with an autonomous agent embodied on a blockchain stored in a blockchain network, the method comprising the following steps: a user engaging in a user authentication process to obtain a set of one or more verified identity attributes of the user; computing an identity hash, by applying a hash function to input data comprising the set of verified identity attributes; and sending to the blockchain network a data package comprising the identity hash and an address (or other identifier) of the autonomous agent; wherein the autonomous agent is embodied on the blockchain as program code and at least one associated state register for storing associated program state, and wherein the data package causes at least a portion of the autonomous agent's program code to be executed on a node of the blockchain network, which upon execution stores the identity hash in the at least one state register of the autonomous agent.

In embodiments, the input data to which the hash function is applied also comprises data of the autonomous agent. For example, data of the program code of the autonomous agent. For example a hash of the program code. Further alternatively, the data of the blockchain agent may be the identifier (e.g. address) of the blockchain agent.

The input data to which the hash function is applied may also comprise details of the user authentication process.

The input data to which the hash function is applied may also comprise an identifier of an issuer from which the set of verified identity attributes is obtained.

The user authentication process may comprise a biometric user authentication process.

The set of verified identity attributes may comprise a biometric attribute and the biometric user authentication process may comprise comparing a captured biometric with the biometric attribute.

The set of user attributes may be obtained from a digital identity system by transmitting to the digital identity system from a user device operated by the user an electronic message comprising at least one of: at least one attribute key for locating the one or more verified identity attributes in a database, and at least one decryption key for decrypting the one or more verified identity attributes.

The message may comprise a credential bound to the user device, wherein the credential may be validated at the digital identity system and the one or more identity attributes may be released in response to determining that the credential is valid.

The electronic message may comprise the captured biometric for comparing with the biometric attribute at the digital identity system.

The user authentication process may comprise a local authentication process performed at the user device, in order to unlock an identity application for instigating the electronic message.

The set of identity attributes may have been verified based on an anchoring document.

The digital identity system may generate in response to the electronic message a receipt comprising or indicating the set of verified identity attributes.

The receipt may comprise information about the autonomous agent (e.g. information identifying the smart contract) and/or the identity hash.

The electronic message may comprise an identifier of another user device of another user, and the receipt may be transmitted to the other user device.

The receipt may comprise the data of the autonomous agent.

The identifier of the other user may be a token captured at the user device, the token being associated with the other user device at the digital identity system.

The input data may be stored in a secure identity container having an address bound to the identity hash.

Upon presentation of the identity hash to a hash proxy, the hash proxy may request the input data to be released to an external device from the identity container.

The input data may only be released to the external device in response to an authorization message received from a user device associated with the identity container. A hash of the input data to be released may be computed therefrom and compared with the identity hash to check that it matches the identity hash.

The set of verified identity attributes may be provided to a hash proxy, which determines the identity hash, and sends the identity hash to the autonomous agent.

An identifier of the autonomous agent may be provided to the hash proxy with the set of verified identity attributes.

The other user device provides the set of identity attributes to the hash proxy.

Another aspect of the invention provides a method of associating user identity with an autonomous agent embodied on a blockchain, the method comprising the following steps: a user engaging in a user authentication process to obtain a set of one or more verified identity attributes of the user; computing an identity hash, by applying a hash function to input data comprising the set of verified identity attributes; and sending to the autonomous agent a data package comprising the identity hash; wherein the autonomous agent is embodied on the blockchain as program code and at least one associated state register for storing associated program state, and wherein the data package causes at least a portion of the autonomous agent's program code to be executed on the blockchain, which upon execution stores the identity hash in the at least one state register of the autonomous agent.

Further aspects of the invention provide a computer system and a computer program configured to implement the above steps. The computer program may be stored on a computer readable storage medium.

BRIEF DESCRIPTION OF FIGURES

For a better understanding of the present invention, and to show how embodiments of the same may be carried into effect, reference is made to the following figures in which:

FIG. 12 shows a signalling diagram for an identity validation process;

FIG. 13 shows a signalling diagram for a process of obtaining a sharing token;

FIG. 14 shows a schematic block diagram of a user device executing an identity application;

DETAILED DESCRIPTION

Example embodiments of the invention are described below, but first some useful context to the invention is described.

Figure 1:
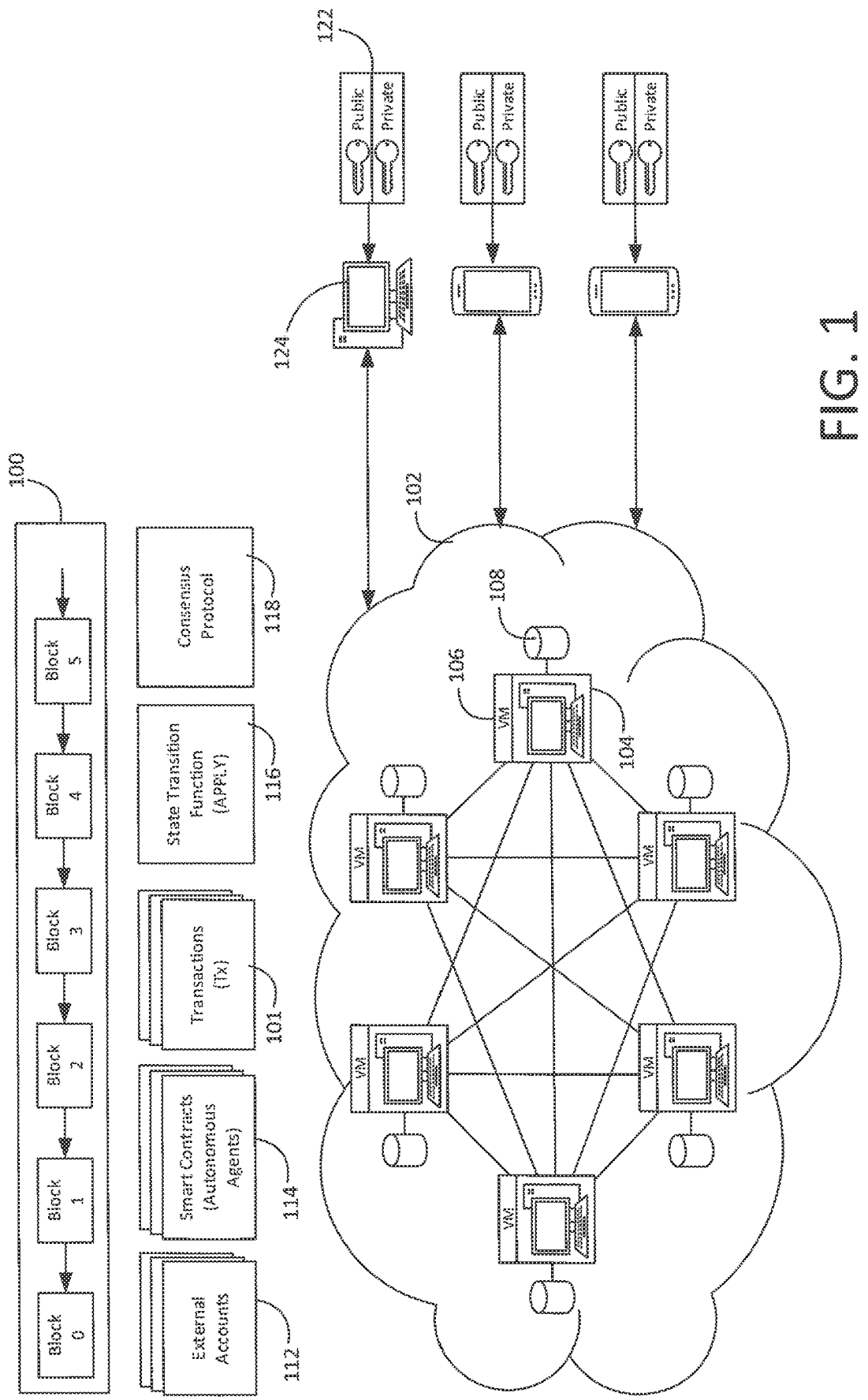
FIG. 1 shows a schematic block diagram of a blockchain network.

FIG. 1 shows a highly schematic block diagram of a system in which embodiments of the present invention may be implemented.

The system is shown to comprise a blockchain network 102, a core function of which is to securely maintain a blockchain 100. A components are shown directly below the blockchain 100 which are high-level components that underpin the blockchain 100.

The blockchain network 102 operates based on blockchain "smart contracts" 114. The principles of smart contracts in the context of blockchain technology are known per se and have, for example, been implemented for a number of years on the publically-accessible Ethereum network. Smart contract technology and the principles that underpin it are therefore only described briefly herein in order to provide relevant context to the described embodiments of the invention. As will be appreciated by those skilled in the art, what follows is a high-level overview of certain relevant aspects of blockchain technology that is by no means intended to be comprehensive or exhaustive.

The blockchain 100 functions as a distributed and effectively immutable transaction ledger in which transactions 101 may be recorded. It is formed of a sequence of blocks (data blocks) which are linked by hash pointers. Each block contains a list of transactions since the previous block, going back as far as a "genesis" block (the first block in the blockchain 100).

A transaction is a form of message which is sent to the blockchain network 102 from an external device 124 and which is broadcast through the blockchain network 102 in order to transfer value and/or convey data between actors. A single transaction can be used to perform one or both of these functions. Value is expressed in a cryptocurrency of the blockchain network 102, such as Ether. Instigating a transaction to the blockchain network 102 causes the transaction to be written to the blockchain 100, provided the transaction is determined to be valid.

Two core mechanisms are provided for maintaining and updating the blockchain 100, namely a state transaction function 116 (APPLY) and a consensus protocol 118 which is used to reach a consensus, within the blockchain network 102, on the state of the blockchain 100.

The blockchain network 102 is a peer-to-peer network formed of a plurality of cooperating blockchain nodes. Each blockchain node 104 is a networked computer device or computer system comprising one or more hardware processing units, such as central processing unit(s) (CPUs) and/or co-processor(s)/accelerator(s) (such as GPUs) etc., on which computer programs may be executed. Each blockchain node 104 has access to electronic storage 108 formed of non-transitory computer-readable storage media such as magnetic storage and/or solid state storage (flash) etc., to and from which it can write and read data. Each blockchain node 104 stores a copy of the blockchain 100 in its electronic storage 108. Each blockchain node 108 may also maintain a current state of the blockchain in the electronic storage 108, by applying the state transition function 116 to transactions it receives. Blockchain nodes may also be referred to as "miners" where part of their function is creating (mining) new valid blocks of the blockchain 100.

In order to provide a distributed runtime environment in which the smart contracts 114 may be executed, each blockchain node 104 runs an instance of a blockchain virtual machine (VM) 106. The VM is an essentially Turing-complete computation engine which underpins the operation of the blockchain network 102. The VM has a defined VM instruction set and an execution architecture according to which instructions in the VM instruction set are executed. This defines a machine language in which smart contracts may be coded, as executable program code (which may be referred to simply as code or (smart) contract code), for execution within the VM runtime environment. A smart contract is a form of "autonomous agent" that is executed within the blockchain network 102 in the manner described below.

Smart contracts are one of two types of actor that can participate in transactions, the other type being external accounts 112. External accounts may also be referred to as wallets. Each external account has an associated cryptographic public-private key pair 122. Any external device 124 having access to the private key associated with an external account can initiate a valid transaction from that account to another actor (external account or smart contract). Actors are identified by public addresses on the blockchain 100. The addresses of each external account is derived from the associated public key. Each external account and smart contract has an associated cryptocurrency balance which is recorded on the blockchain 100. Value is transferred between actors by deducting an amount from the balance of one actor and incrementing the balance of another actor by a corresponding amount.

Smart contracts also have accounts (contract accounts), which also have associated public addresses within the blockchain 100. The term account may thus be used to refer to an external account or a contract account.

Figure 2:
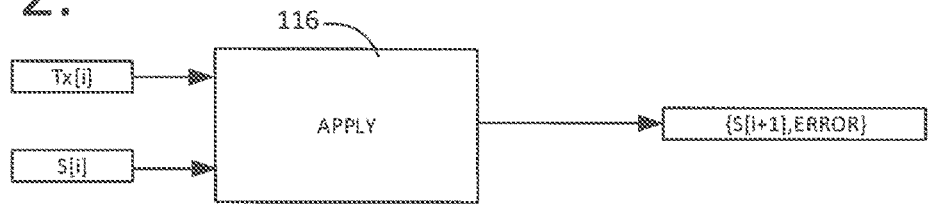
FIG. 2 shows a function block diagram of a state transition function.

FIG. 2 is a function block diagram of the state transition function 116. The state transition function 116 takes as inputs a transaction Tx[i] and a current blockchain state S[i]. The current blockchain state S[i] is defined by all of the transactions that precede Tx[i], i.e. Tx[i−1], . . . , Tx[0]. The state transition function operates to:

validate Tx[i], and
if Tx[i] is valid, compute a new blockchain state S[i+1] by executing Tx[i] given S[i]. The resulting output of the state transition function 116, written as APPLY(S[i], Tx[i]), is:
the new blockchain state, S[i+1], in the event that transaction Tx[i] is determined to be valid;
an error in the event that the transaction Tx[i] is determined to be invalid.

The blockchain state is updated recursively in this manner as new transaction are received. The current state of the blockchain 100 can be recovered by repeatedly applying the state transition function in turn to every transaction event recorded on it, starting with the first.

There are various requirements that a transaction Tx[i] initiated from an account (source account) must meet in order to be valid, which include the following:

Tx[i] includes a valid signature as generated from the private key associated with the source account; and
Tx[i] does not attempt to transfer cryptocurrency that is non-existent given the current state of the blockchain S[i], which would be the case if it were attempting to transfer an amount greater than the balance of the source account as denoted by the current state S[i].

Note these validity requirements are not necessarily exhaustive.

In the case of a valid transaction sent to a smart contract (i.e. having the public address of a contract account in its destination field), S[i+1] may depend on the code of the smart contract. In that case, the relevant code of the smart contract will be executed in order to apply the state transition function 116. Hence that code will be executed every time that transaction is validated, which in practice mans that this code may be executed at every node of the blockchain network 102, possibly on multiple occasions.

Each block comprises a transaction list, which is a list of transactions since the previous block. There are various conditions that must be satisfied by a block in order for it to be valid:

the block must reference a previous block which exists and is valid;
the block must have a timestamp within a defined time window of the timestamp of the previous block;
every transaction in the block must be valid, which can be formalized as follows:
Let Tx[0], . . . , Tx[I−1] be the list of transactions in the block in question;
Let S[0] be the state of the blockchain at the end of the previous block;
Then APPLY(S[i], Tx[i]) must return a valid block state S[i+1] (an not an error) for all i=0, . . . , I−1.

With a "proof of work" consensus protocol, blockchain nodes "compete" to "mine" valid blocks to be added to the blockchain 100. In this context, each block is also required to have a valid "proof of work".

Note the above are not necessarily exhaustive conditions of block validity.

Transactions may be written to the blockchain 100 in the following manner.

Figure 3:
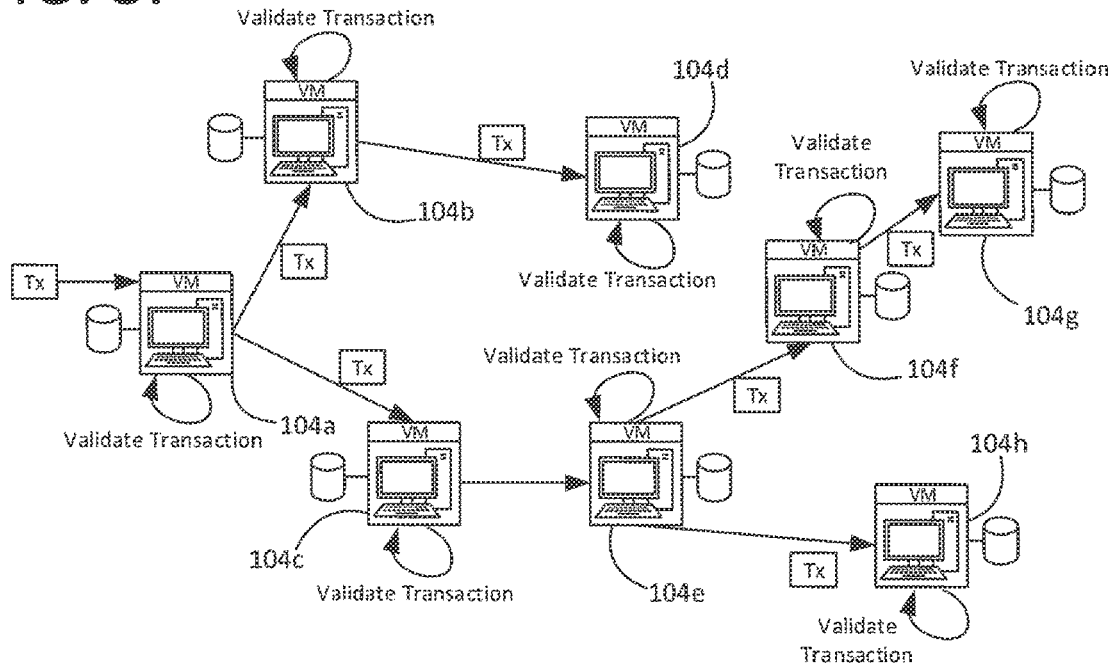
FIG. 3 shows an example of a received transaction being validated in a blockchain network.

FIG. 3 shows a transaction (Tx) being received at a blockchain node 104a. Copies of Tx are distributed throughout the network in a peer-to-peer fashion, such that Tx is (eventually) rendered available to every node of the blockchain network 102. Copies of Tx are shown being distributed to blockchain nodes 104b-104g, however as will be appreciated there may be a much greater number of nodes than this in a blockchain network. Every node that receives Tx validates the transaction by applying the state transition function 116 to it, in order to determine whether or not it should be included in the next block when it is mined.

Figure 4:
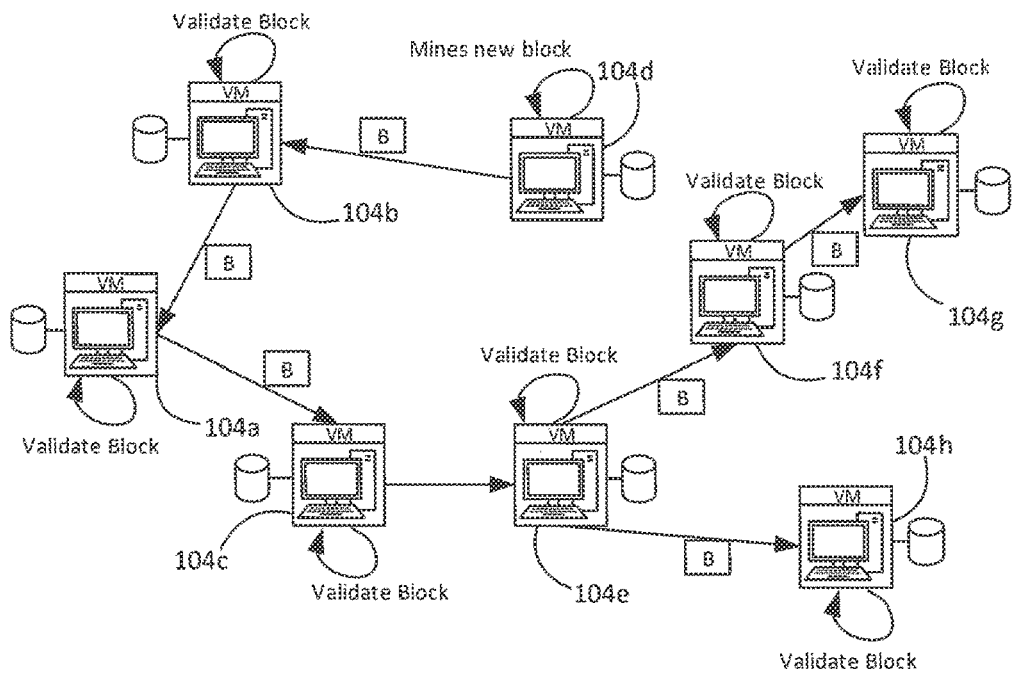
FIG. 4 shows an example of a block being validated in a blockchain network.

FIG. 4 shows the blockchain network 102 at a time when block 104d has mined a new block (B). B is distributed throughout the blockchain network 102, and each of the other blockchain nodes independently validates B to check that it meets all of the block validity requirements.

Both transaction validations and block validations involve the application of the state transition function 116 to transactions at each validating node. As noted, for transactions sent to smart contracts, this may necessitate executing some or all of the code of the smart contract in order to determine the change in the state of the blockchain 100, i.e. a smart contract may be caused to process data of a transaction in applying the state transition function 116 to that transaction. In other words, the execution of smart contracts is transaction driven and, for a transaction whose output is dependent on the execution of a smart contract, every time that transaction is validated (now or in the future), this will cause the relevant smart contract code to be executed at the validating blockchain node, in order to process the relevant data of that transaction.

Figure 5:
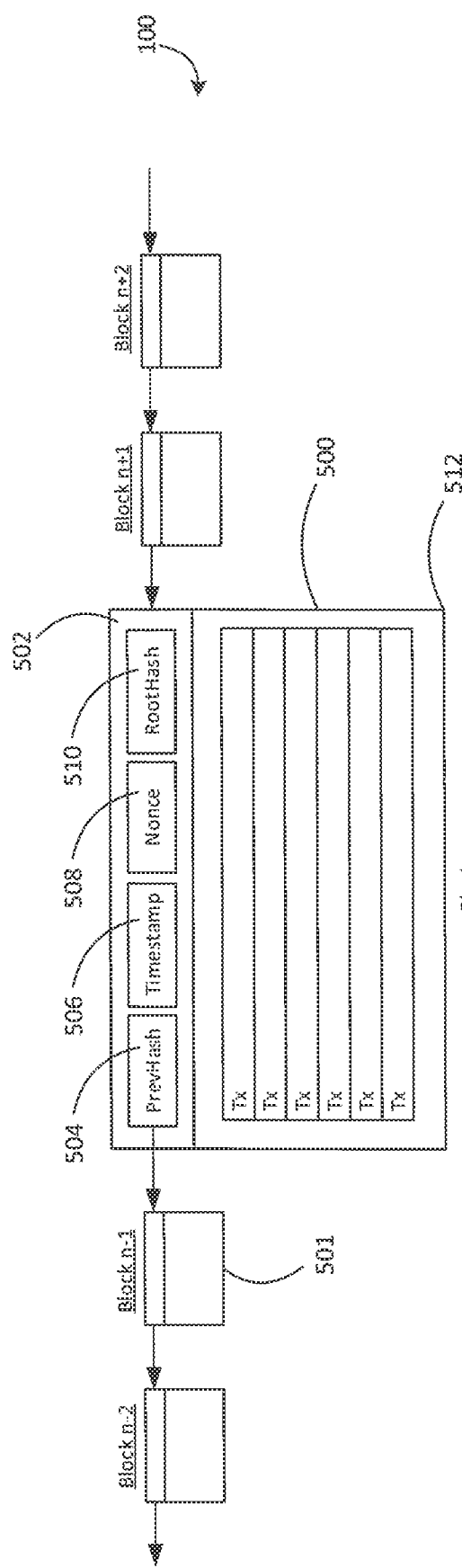
FIG. 5 shows a schematic block diagram of an example blockchain.

FIG. 5 shows certain high-level structure of a block 500 within the blockchain 100 (block n). The block 500 can be a block at any position within the blockchain 100—all blocks have essentially the same structure. The block 500 is shown to comprise: a block header 502 containing a pointer to the previous block 501 in the blockchain 100 (block n−1), in the form of a hash of data of the previous block 501 (PrevHash); a timestamp 506; a nonce 508; and a root hash 510. The block 500 is also shown to comprise a block payload 512 containing a list of transactions. The list of transactions may for example be stored in a Merkel tree, of which the root hash 510 is a root, as is known in the art.

Figure 6:
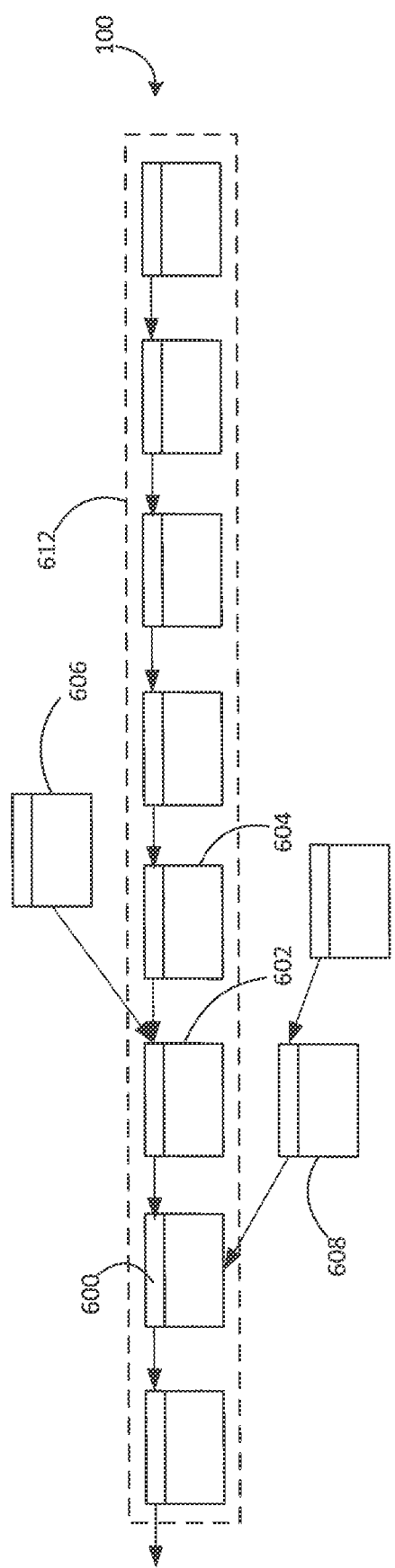
FIG. 6 shows further details of an example blockchain.

FIG. 6 is a schematic block diagram showing a possible structure of the blockchain 100 in greater detail in order to illustrate certain principles of the consensus protocol 118 in a proof of work system.

In a proof of work system, the blockchain 100 is secured based on computational resource requirements. The requirement for a valid proof of work for each block makes block mining computationally expensive. A common proof of work requirement is that a hash of the block, such as the double-SHA256 hash, must be below a threshold value agreed within the blockchain network 102 (which may be determined dynamically). The only feasible way to achieve this is by trying different values of the nonce 508 in the block, until this requirement is met. For an established blockchain, this may require a vast number of tries until a nonce value is found that causes a block to meet the proof of work requirements.

Mining is incentivized by rewarding miners for mining valid blocks. The reward can take different forms, but a common mechanism is that a miner is rewarded by way of a block mining fee for successfully mining a new block and transaction fees for the transactions recorded in the mined block (transaction fees may for example be computed based on an amount of computation and/or an amount of storage required to execute a transaction). The transfer of the fees to the miner are recorded as cryptocurrency transfers in the newly-mined block itself. There is nothing to stop different miners mining independently valid blocks that follow on from a given block, thus creating "forks" in the blockchain 100. By way of example, FIG. 6 shows two independently valid blocks 602 and 608 that precede block 600, and a further two independently valid blocks 604, 606 that precede block 604. This results in two forks in the blockchain 100 at blocks 600 and 602 respectively. This situation is addressed by the consensus protocol 118. Essentially, according to the consensus protocol 188, the longest fork is recognized at the valid fork—hence, in this example, the sequence of blocks labelled 612 would be recognized as valid, because it is comprised of the longest forks. For an interval of time after a fork occurs, nodes within the blockchain network 102 may attempt (and succeed) to mine blocks on both forks. However, as one fork starts to overtake another, miners will be incentivised to mine on the longer fork (miners generally have no incentive to mine on a shorter fork because, although they may be able to continue to mine valid blocks on the shorter fork and record mining and transaction fees for themselves in those blocks, those fees have no value because they are now a fork that the network 102 does not recognize as valid). This, in turn, drives the growth of the longest fork, which in turn drives miners to mine on that fork, until it gets to a point where the longer fork overtakes the shortest fork to the extent that it would be computationally infeasible for the shorter fork to overtake it, unless a majority of nodes within the network 102 were to collude to grow the shorter fork—the so-called "51% attack".

Proof of work is not the only mechanism for securing a blockchain. For example, in a "proof of stake" system essentially virtualizes the mining process. In a proof of stake system, miners are instead limited to mining a percentage of blocks that is determined based on the percentage of cryptocurrency they hold. This reduces the computational requirements significantly, and also means that the network is only vulnerable to a 51% attack from those holding a majority of the available cryptocurrency (the logic being that those entities have no incentive to compromise a network in which they own a majority of the cryptocurrency).

It is in this sense that the blockchain 100 is immutable: once a fork has reached critical length, the record of the transactions within it cannot feasibly be altered without a 51% attack.

Figure 7:
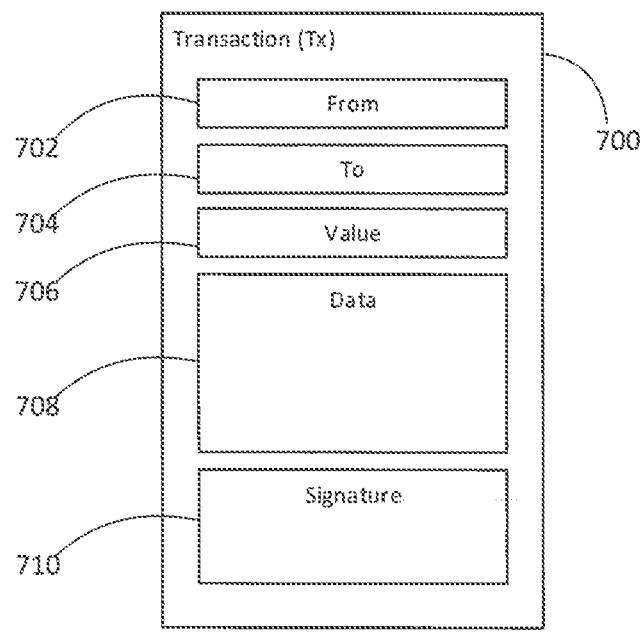
FIG. 7 shows a schematic block diagram showing high-level structure of a blockchain transaction.

FIG. 7 shows a schematic block diagram illustrating certain high-level structure of a transaction 800 that may be sent to the blockchain network 102 for validating and recording on the blockchain 100.

The transaction 800 is in the form of a data package having the following data fields: a source (from) address filed containing an address of a source account; a destination field 704 containing an address of a destination (to) account; a value field 706 containing an amount of cryptocurrency to be transferred from the source account to the destination account (which can be zero); a data field 708 which can contain arbitrary data (to be processed by a smart contract for example); and a signature field 710 which much contain a valid signature, which is validated using the public key associated with the source account (and which requires the associated private key to generate).

Figure 8:
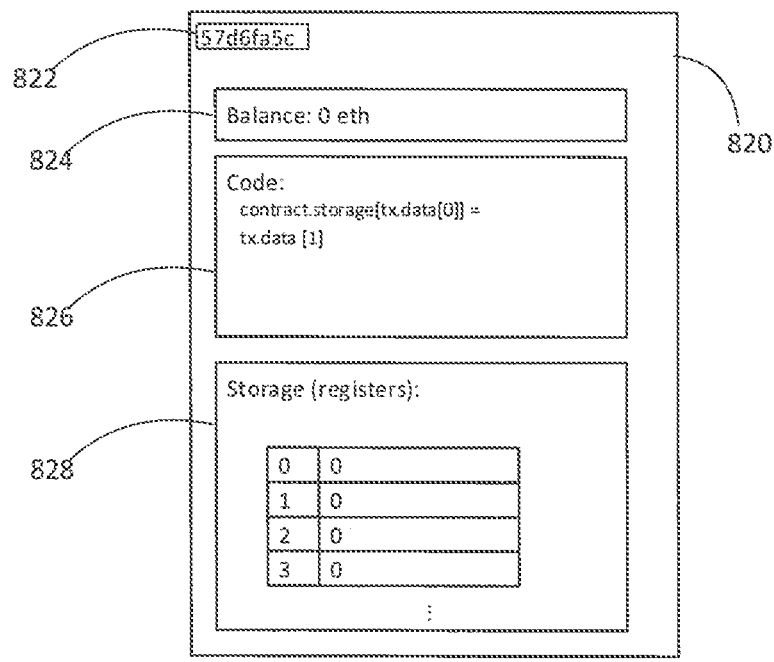
FIG. 8 shows a schematic block diagram showing high-level structure of a blockchain account.

FIG. 8 shows a schematic block diagram illustrating certain high-level structure of an account 820 within the blockchain network 100. Every account 820 has a public address 822, which in the case of an external account is derived from the associated public key. An account 820 also has a balance denoting the cryptocurrency held in that account 820.

In the case of a smart contract account, the account 820 also contains smart contract code 826 and a set of indexed storage locations 828 to and from which the smart contract code can read and write data. Such storage locations are referred to herein as "state registers" and any data written to a state register by the smart contract code 826 is considered a form of program state associated with the smart contract code 826 (such program state being one component of the overall blockchain state, as determined through successive application of the state transition function 116). The state registers 828 are virtual registers, and there can be an infinite number in theory although in practice this may be limited by transaction fees. The state registers 820 provide persistent storage, i.e. the data stored therein persist after execution of the contract code 826 in response to a transaction, in order to preserve program state for subsequent transactions. Although not shown in FIG. 8, temporary storage may also be provided for a contract account, which is reset at the end of processing a transaction.

Accounts form part of the blockchain state. Accounts may be created by a transaction. That transaction, if valid, will be recorded on the blockchain and the account will be created as part of the blockchain state by applying the state transition function 116 to it. Hence accounts are immutable.

Figure 9:
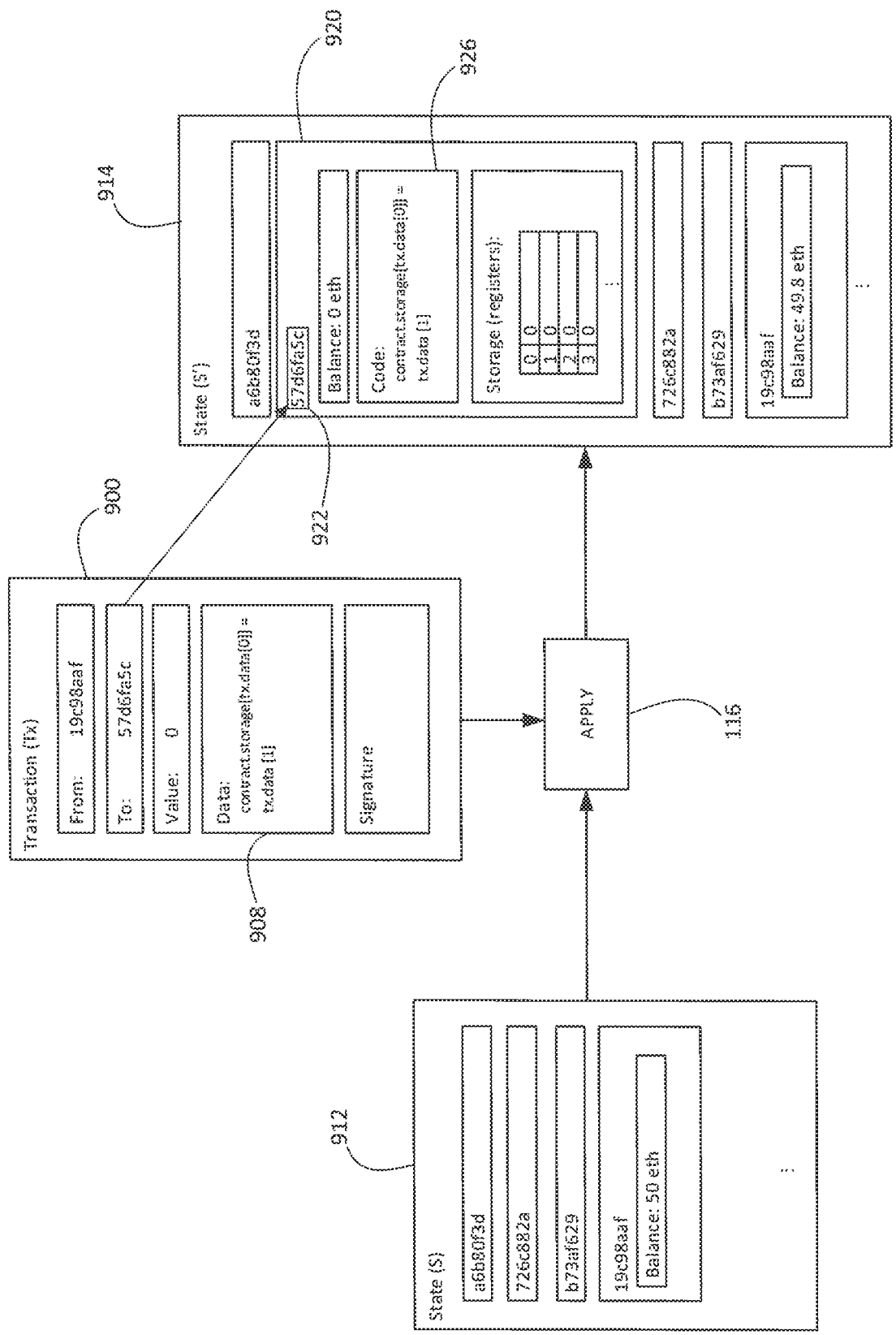
FIG. 9 shows an example of a transaction to deploy a smart contract to a blockchain.

FIG. 9 is a schematic block diagram showing how a smart contract may be deployed on the blockchain.

In order to create a contract account for the smart contract, a contract deployment transaction 900 is sent to a selected account address which does exist yet. That is, the destination field is set to a value which does not correspond to any existing account given the current state of the blockchain 912.

The state transition function 116 is applied to the contract deployment transaction 900, having determined a current state 912 of the blockchain 100 in the manner described above.

This has the effect of validating the contract deployment transaction 900 and, if the transaction 900 is valid, determining a new state 914 of the blockchain 100. As shown, the new state 914 includes a new account 920 created for the deployed contract, having an address 922 as specified in the contract deployment transaction 900.

The contract deployment transaction 900 contains, in its data field 908, code of the smart contract to be deployed, which in turn becomes the code 926 of the smart contract account 922 that forms part of the new blockchain state 914.

With smart contracts, the smart contract code is thus stored in the blockchain 100 itself: a smart contract is created by instigating a contract deployment transaction to the blockchain network 102 containing the code of the smart contract to be created, and that transaction is in turn stored on the blockchain 100 as above assuming it is valid. Hence the smart contract code is immutable in the same way that other data stored on the blockchain 100 is immutable.

Figure 10:
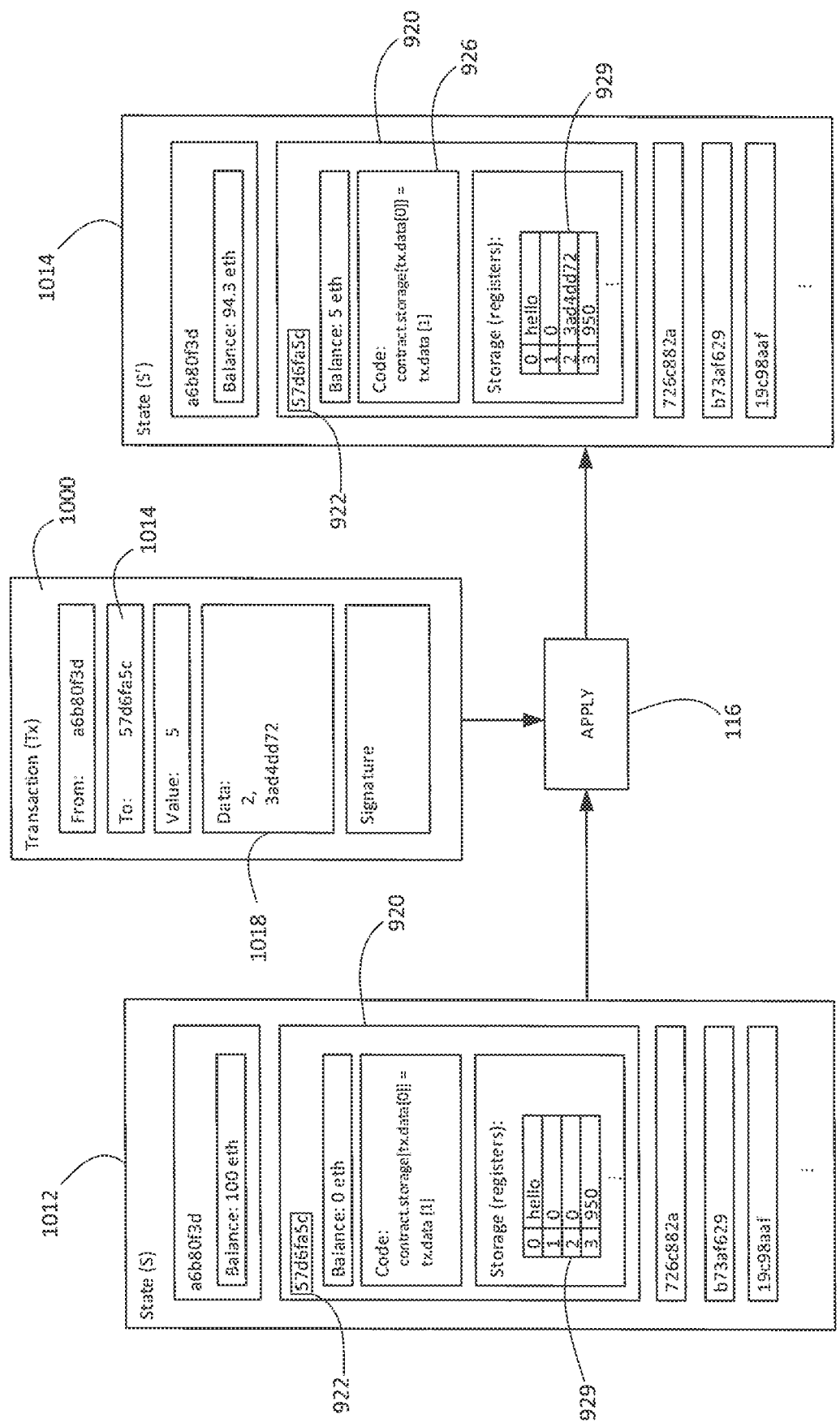
FIG. 10 shows a block diagram of a transaction to store data in a smart contract account.

FIG. 10 is a schematic block diagram showing how data may be sent to an existing smart contract for processing.

The data is sent in the data field 1018 of a transaction 1000 sent to an existing smart contract. That is, a transaction 1000 denoting the address 922 of a contract account 920 that exists in a current state 1012 of the blockchain 100.

In this example, the data comprises two values "2" and "3ad4dd72". The code of the existing smart contract 926 interprets this to mean that the value "3ad4dd72" should be stored the smart contract's state register having index "2" (labelled 929).

When the state transition function 116 is applied to the transaction 1000, this causes the code of the destination smart contract 926 to be executed, in order to process the data contained in the data field 1018 of the transaction 1000. This in turn causes the value "3ad4dd72" to be stored in the state register 929 having index "2" within the resulting new blockchain state 1014.

Again, the transaction 1000, if valid, is stored on the blockchain 100 and is immutable in the above sense. Every time the state transition function 116 is applied to the transaction (so every time it is validated at each blockchain node), this causes the relevant smart contract code 926 to be executed, in order to process the relevant data of the transaction 100 and update the blockchain state accordingly.

As noted, smart contracts are a form of autonomous agent. The name smart contract stems from the notion that two (or more) parties can formalize an agreement as conditional statements in a computer program, which in turn can be deployed as a smart contract on the blockchain 100. For example, two external entities might enter into an arrangement whereby one (the payer) will pay the other (the payee) a certain amount provided a certain event occurs within a certain time frame. A smart contract can be deployed to broker this agreement. The paying party transfers the agreed amount to the smart contract which is added to the balance of the smart contract's account and is held thereafter in "escrow". The smart contract is coded to automatically transfer that amount from its own balance to an agreed external account accessible to the payee, if it receives confirmation within that time frame, from an agreed source, that the event has occurred; however, if that time frame elapses without such confirmation having been received, the contract will transfer the balance back to an external account of the payer on request after that point. As will be appreciated, this is a simplified example for the sake of illustration. The essentially Turing-complete blockchain VM can accommodate essentially any form of agreement that can be viably coded so as to be "self-executing".

Within the blockchain network 102, the only public identities that entities have are the public addresses associated with their accounts. On the one hand, this is a benefit as it permits anonymized transactions. On the other hand, in the event of (say) a dispute between parties, or where there has been nefarious activity, it may be impossible to tie a transaction or series of transaction back to an actual individual. Whilst this could be solved for example by storing the parties "real-world" identities on the blockchain 100, this would entirely remove their anonymity, as their identities would be visible to anyone in the world at large on a public blockchain.

The described embodiments provide a method of attaching, to a smart contract, a verified identities of party, but in an anonymized fashion.

This is described in detail below but for now suffice it to say that a user engages in a user authentication process (method) to obtain a set of one or more verified identity attributes of that user. The user authentication process is performed in order to verify that the set of attributes corresponds to that user, i.e. the user authentication process requires the user to demonstrate that the set of attributes does constitute his own identity (and not somebody else) to a required standard of proof.

The set of verified attributes forms input data to a hash function. The hash function computes a hash of the input data (identity hash). The identity hash is stored in one of the state registers of the smart contract itself, and is thus immutably recorded on the blockchain 100. The hash function is a one-way function which means the set of identity attributes cannot be recovered from it. However a user in possession of a set of identity attributes can verify whether or not they match the identity hash, by hashing the set of identity attributes in their possession and determining whether they match the identity hash immutably associated with the smart contract on the blockchain 100. The input data to the hash function can also include other types of related information, examples of which are described later.

An example of a process in which verified identity attributes may be obtained for this purpose will now be described.

FIG. 11 shows a highly schematic functional block diagram of a digital identity system 1 from which verified identity attributes are released when certain conditions are satisfied.

Reference is made to International patent application published as WO2016/128569 and United States patent applications published as: US2016/0239653; US2016/0239657; US2016/0241531; US2016/0239658; and US2016/0241532, each of which is incorporated herein by reference in its entirety. These disclose variants of a digital identity system (the YOTI/uPass system as it is referred to therein) in which a verified digital identity may be created for sharing with other entities. The digital identity may be anchored to a trusted source of identity information, such as a passport, driving license, ID card etc. In that case, verification is provided based on the trusted source of identity information. The digital identity system 1 may be configured as disclosed in any of the aforementioned.

By way of example, in the following, the digital identity system 1 takes the form of the "YOTI" system as disclosed WO2016/12856. Features of the YOTI system that are relevant to the present invention are summarized below.

The digital identity system 1 is shown to comprise a secure store 1102 in which digital identity attributes may be stored securely. A digital identity in this context refers to a digital identity attribute or set of such attributes defining an identity of a user. A user's identity attributes are encrypted using a user key that is held on the user's own device, which the user must provide in order for them to be decrypted. Attributes are stored at locations in the secure store 1102 that are identified by database keys (attribute keys) which are also held on a user's own device. The only thing that links a user's attributes together in the secure store 1102 are the attribute keys held by the user.

The digital identity system 1 is also configured to provide various services, including an enrolment service 14a which allows users to create digital identities, a validation service 14b which allows a user to share all or part of his digital identity with another user, and a biometric user authentication service 1108 which can verify a user biometrically based on a biometric digital identity attribute (e.g. comprising facial image data).

In order to enroll with the enrolment service 14a, the user may be required to submit data captured from an identity document (e.g. by taking an image thereof or reading a chip therein). The attributes are derived from the captured identity document data, and may be verified by matching a biometric of the identity document with a biometric captured from the user (e.g. self-image or "selfie") using a biometric sensor (e.g. image capture device) of their user device.

Although not shown in FIG. 11, the digital identity system 1 comprises one or more processors (CPUs/GPUs etc.) on which computer programs are executed in order to provide the above services, and a network interface that allows the digital identity system 1 to communicate with external devices (such as user devices) via a network such as the Internet.

FIG. 12 shows a flow diagram for an identity sharing process conducted between two entities that is mediated by the digital identity system 1. In this example, the entities are users (not shown) operating respective user devices 1202 (bearer device) and 1204 (validator device/capturing device).

The process can be a one-way sharing process in which only one user shares identity attribute(s) with the other, or it can be a two way process in which each shares identity attribute(s) with the other.

In order to initiate the process, at step S2, the bearer device 1202 renders accessible to the capturing device 120 a token 1206 that is associated, within the digital identity system 1, with the bearer device 1202. The token 1206 can take various forms. In the following examples, it is in the form of a sharing token bound to an underling bearer credential.

In the case that the user of the bearer device 1202 (the bearer) is sharing identity attribute(s) with the user of the capturing device 1204 (the validator/capturer), the token 1206 is associated in the digital identity system 1 with the bearer's attribute(s) to be shared.

The token 1206 is rendered available by the bearer device 1202 with a policy 1208, which identifies any identity attribute types the bearer is willing to share with the user of the capturing device 1204 (the capturer) and any identity attribute types the bearer requires the capturer to share in return.

These are captured at the capturing device 1204 and, at step S4, the capturing device 1204 sends, in an electronic message to the digital identity system 1, the captured token 1206 and policy 1028, together with a capturer credential 1210. In the case that the capturer is sharing one or more identity attributes with the bearer, these are also sent with an encrypted version of the capturer's user key 1212 (Dk(Uk)) and a set of one or more attribute keys 1214, which identity the location(s) of the capturer's attributes, in the secure store 1102, to be shared in accordance with the policy 1208. The user key 1212 is encrypted using a device key (Dk) that is also accessible to the digital identity system 1, so that it can be descripted thereat.

The capturer credential 1210 is validated at the digital identity system 1, by the validation service 14b, and if it is valid, the attribute key(s) 1214 are used to locate the capturer's attribute(s) to be shared, and the capturer's user key 1212 is used to decrypt those attribute(s) for sharing. This may also require the policy 1206 provided by the capturing device 1204 to match a policy associated with the token 1202.

At steps S6a and S6b, the digital identity system 1 transmits (or otherwise renders accessible), to the bearer and capturing devices 1202, 1204, respective identity receipts 1216a, 1216b (paired receipts).

The receipt 1216a sent to the bearer device 1202 (bearer receipt) comprises or indicates any identity attributes of the capturer that have been shared with the bearer. Likewise, the receipt 1216b sent to the capturing device 1204 (capturer receipt) comprises or indicates any identity attributes of the bearer that have been shared with the validator (as associated with the token 1206). A receipt may indicate attributes for example by way of a link in the receipt to a memory location at which the attributes are stored (published).

Each receipt 1216 may be cryptographically signed, to generate a cryptographic signature for the receipt, using a private key held securely within the digital identity system, so that its contents can be verified cryptographically using the corresponding public key.

FIG. 13 shows a flow diagram for a process in which the bearer device 1202 obtains the token 1206 for use in the above process. The bearer device 1202 transmits to the digital identity system a bearer credential 1308, in association with the policy 1208. In order to associate the token with identity attribute(s) to be shared, the bearer device sends these together with the bearer's user key 1312 and one or more attribute keys 1314 for locating, in the secure store 1102, the bearer attributes to be associated with the token 1206. This allows the attribute(s) to be located and decrypted for subsequent sharing. In response, the bearer device 1202 receives the token 1206 for use in the process of FIG. 12. At this point, as well as being bound to the specified bearer identity attribute(s) (if any), the token 1206 is bound to the policy 1208 as received from the bearer device 1202, and can only be used to share attributes in accordance with the policy 1208 to which it is bound. As described above, a matching policy may be required to be presented to the digital identity system 1 in order to use the token 1206 to cause a release of identity attributes from the digital identity system 1. The token 1206 is also associated with the bearer device 1202 and thus functions as an identifier of the bearer device 1202.

FIG. 14 shows a highly schematic block diagram of a user device 1400 such as the bearer or capturing device 1202, 1204. An identity application 1402 is executed on a processor of the user device 1400 (not shown) in order to allow the user device 1400 to interface with the digital identity system, e.g. in order to participate the process of FIG. 12 or 13. The identity application 1402 is secured by a PIN (personal identification number) or other secret user authentication data 1404 which a user much enter, in order to unlock the identity application 1402, in a local user authentication process performed at the user device 1400. This means that a user can only share their identity attribute(s) once they have successfully completed the local user authentication process by entering the correct PIN to unlock the app. Hence the user's identity attributes are secured by the PIN 1404. This is one way of authenticating a user in order to release his identity attributes.

Further or alternatively, biometric authentication may be used to secure a user's identity attributes. This can be performed locally at the user device 1400, or it may be performed remotely at the digital identity system, by the biometric user authentication service 1108. For example, an additional requirement may be imposed in the process of FIGS. 12 and/or 13, wherein the user in question is required to submit a captured biometric (e.g. a selfie captured at their device) along with the other elements (credential etc.) for comparison with a corresponding biometric identity attribute held in the secure store 1102. In this case, the user provides the attribute key for locating the biometric identity attribute (and the user key for decrypting it). The identity attribute(s) in question will only be released for sharing with the other user if the captured biometric matches the biometric identity attribute. This is another way of authenticating a user in order to release his identity attributes.

A layer of verification can also be provided by anchoring the identity attributes to an identity document or other anchoring document (passport, driving license, ID card etc.). In this case the identity attributes can be captured from or otherwise matched to the anchoring document. As noted, this can for example form part of the enrolment process, in which a user creates a digital identity for himself.

As will be appreciated, these are just some examples of user authentication processes that a user can engage in order to obtain a set of verified identity attributes. Generally any suitable user authentication process can be implemented in order to verify that the set of identity attributes in question does correspond to the user engaging in the user authentication process (and not somebody else).

Different user authentication methods may be available, possibly with different levels of confidence/robustness. In some cases, a user authentication requirement may be specified within the policy 1208 itself. The user authentication requirement may denotes a required type(s) of user authentication process. In that case, the release of identity attributes in the process of FIG. 12 is contingent on successful completion of a user authentication process (s) of the required type(s).

In the following, it is assumed that the two users (the bearer and the capturer) desire to enter into an agreement brokered by a smart contract (1500, FIG. 15), and that each user has obtained a set of one or more verified identity attributes of the other user from the digital identity system 1 by way of the process of FIG. 12.

Figure 15:
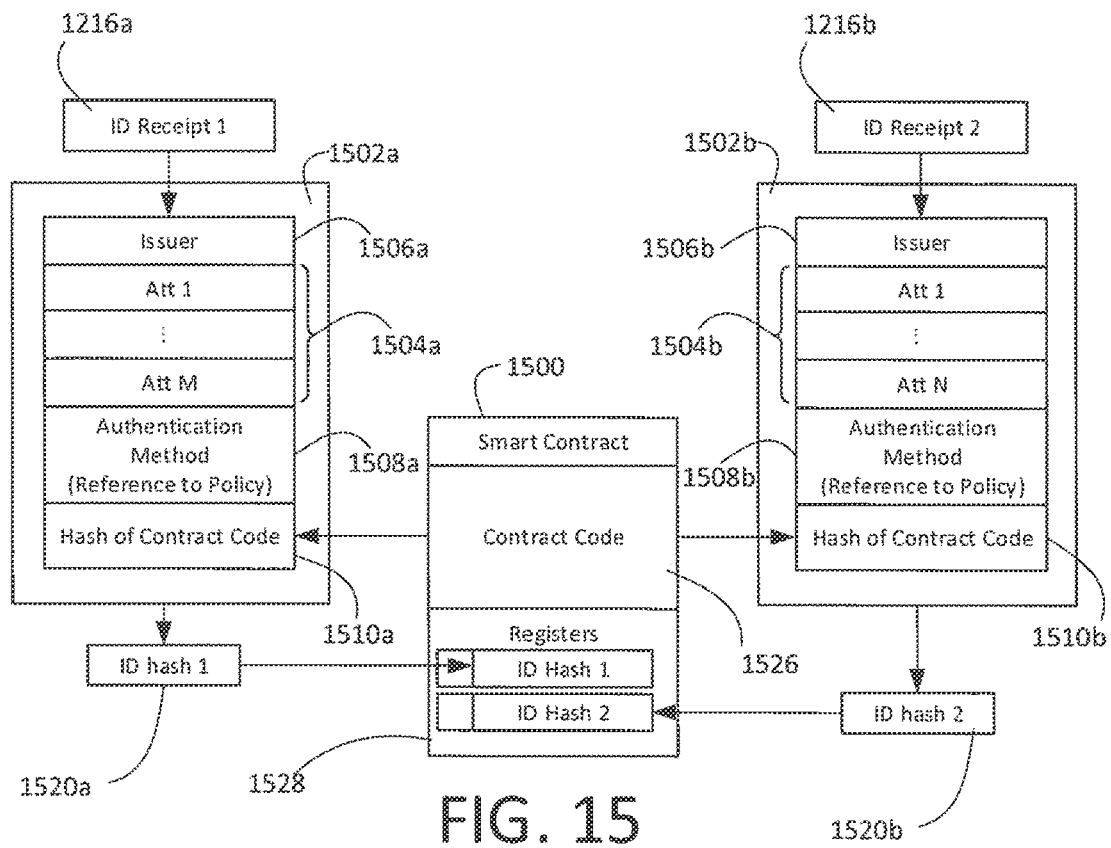
FIG. 15 shows by example how identity data may be anonymously attached to a blockchain smart contract.

FIG. 15 is a schematic block diagram showing how each user's verified identity attributes may be anonymously and immutably associated with the smart contract 1500 in question.

A first set of input data 1520*a* is constructed using the bearer receipt 1216*a*, and comprises a set of one or more verified identity attributes of the capturer 1504*a* as extracted from the bearer receipt 1216*a* (from step S6*a*, FIG. 12). Likewise, a second set of input data 1502*b* is constructed using the capturer receipt 1216*b* (from step S6*b*, FIG. 12), and comprises a set of one or more verified identity attributes of the bearer 1504*a* as extracted from the capturer receipt 1216*a*.

Each set of input data 1502*a*, 1502*b* also includes:
1. an identifier of the receipt (1506*a*, 1506*b* respectively), which in this case is an identifier of the digital identity system 1 or an operator thereof (the issuer);
2. details of the user authentication method used to verify the set of identity attributes 1504*a* contained therein (1508*a*, 1508*b* respectively);
3. a hash of code 1526 of the smart contract 1500 with which the identity attributes are to be anonymously associated (1510*a*, 1510*b* respectively) and/or the public address of the smart contract within the blockchain network 102.

These may be included in the receipt 1216*a*, 1216*b* from which the identity hash in question 1520*a*, 1520*b* is computed, which means they can be cryptographically verified based on the receipt's cryptographic signature.

First and second identity hashes 1520*a*, 1520*b* are then computed by hashing the first and second sets of input data 1502*a*, 1502*b* respectively. The result is a first identity hash 1520 (the hash of the first set of input data 1502*a*) and a second identity hash 1520*b* (the hash of the second set of input data 1502*b*). The identity hashes 1520*a*, 1520*b* are then immutably stored in respective ones of the state registers 1528 of the smart contract 1500, in the manner described above.

Together, 1 and 2 in the above list indicate a level of confidence that can be attributed to the identity attributes. This depends on the level of trust associated with the issuer (1, above), and also on the level of confidence that can be attributed to the user authentication method (2, above). For example a higher level of trust may be attributed to biometric user authentication compared with PIN/password-based user authentication. Further or alternatively, a higher level of confidence may be attributed to attributes which are anchored to, say, a passport.

As noted, the policy 1208 (see FIGS. 12 and 13) may contain a user authentication requirement for obtaining the identity attributes in question. In that case, the details of the user authentication process 1508*a*, 1508*b* may comprise data of or a reference to the policy 1208 a part of the policy comprising the user authentication requirement.

Regarding 3 above, the hashes of the smart contract code 1510*a*, 1510*b* bind the first and second sets of input data 1502*a*, 1502*b* to the smart contract 1500. This ensures that, if one of the identity hashes 1520*a*, 1520*b* is associated with a different smart contract, the mismatch between the code of the different smart contract and the code of the original set of input data can be detected by an entity in possession of the original set of input data 1502*a*, 1502*b*. This exploits the fact that the code of a smart contract, once written to the blockchain 100, is immutable. This provides protection against the wrongful attachment of identity hashes to smart contracts even when the differences in code are slight. This could for example prevent an identity hash from being validly attached to a smart contract whose code has been altered subsequent to the creation of the identity hash, in blockchain architectures which permit the editing of the code of a deployed smart contract. Even for blockchain architectures which do not permit editing of a smart contract once deployed to the blockchain, it may be possible to create "spoof" contracts with very similar code, and this approach prevents identity hashes from being validly attached to such spoof contracts.

If desired, the smart contract can be coded such that execution of the contract is conditional on one or more required identity hashes being provided as above. In that case, a certain action or actions (such as transferring an amount of cryptocurrency) will only be performed when the required identity hash/hashes have been provided. This can be effected by incorporating suitable conditional logic within the smart contract code 1526. Hence, the smart contract only becomes executable once the required identity hash(es) have been attached to it.

Figure 16:
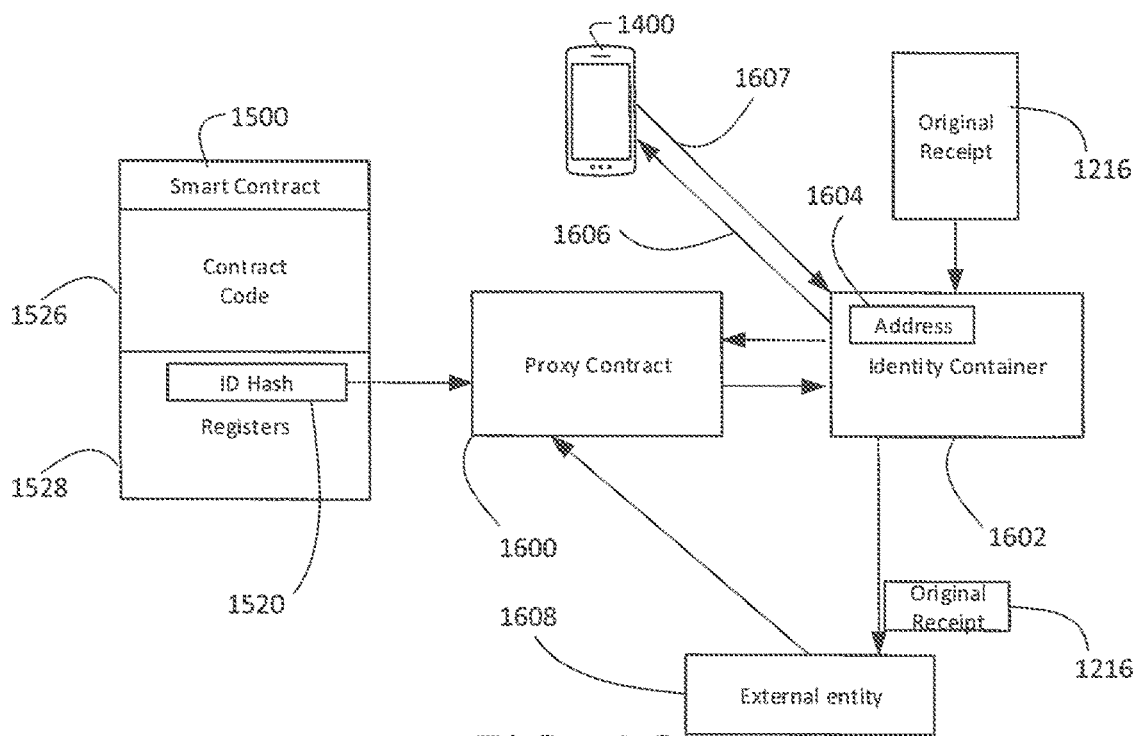
FIG. 16 shows a schematic function block diagram of a hash proxy.

FIG. 16 shows a schematic block diagram which shows an arrangement in which interactions with the above smart contract 1500 are conducted via a hash proxy, in the form of an intermediate proxy contract 1600.

The proxy contract may for example be a separate (and thus separately addressable) smart contract embodied on the blockchain 100 in fundamentally the exact same manner.

However it is implemented, the hash proxy 1600 operates as a gateway to an off-chain system 1602 (identity container) that secures and maintains the identity attributes private to the public blockchain. The identity container 1602 is a secure computer system having computational and storage resources, and an application programming interface (API) via which it is accessed.

The hash proxy 1600 can have a parameter (public key) of the off chain container for authentication with the identity container 1602.

The hash proxy 1600 operates to effect verification an identity hash 1520 that has been attached to a smart contract 1500 as above. The original receipt 1216 from which the identity has is computed is stored securely in the identity container 1602.

The identity container 1604 has an address which uniquely identifies it to the hash proxy 1600.

The identity hash 1520 is bound (cryptographically or otherwise) to the address 1604 of the identity container 1602 in which the original receipt 1216 is stored. For example, the address 1604 can comprise or be derived the identity hash 1520, or the address 1604 may be stored as part of the smart contract state in the same way as the identity hash. As another example, the identity hash 1502 may be indirectly linked to the identity container 1602 based on a "distributed identifier" (DID); in that case, a separate blockchain system provides selective access to the data contained in the identity container in an anonymized fashion, with the user's consent (see below). The principles of distributed identifiers are known per se and are therefore not described in further detail herein.

An external entity 1608 can invoke the hash proxy 1600 in order to verify the identity hash 1502 attached to the smart contract 1500. In response, the hash proxy 1600 determines the address 1604 of the identity container to which the identity hash 1502 is bound, in order to instigate a request to the identity container 1602 for the original receipt 1216 from which the identity hash 1502 was computed.

An authorized user device 1400 is associated with the identity container 1602. The identity container 1602 will only release the original receipt 1216 with the consent of the user who "owns" the receipt, i.e. the user of the authorized device 1400. To obtain consent, the identity container 1602 may, for example, send a push notification to the authorized device 1400. If the user consents, a notification of their consent is sent from the authorized device 1400 to the identity container 1604, and in response the identity container releases the original receipt 1216 to the external entity. This means that the user retains complete control of their identity, such that their "real-world" identity will only be revealed at their consent.

The identity container 1602 may also compute a hash of the original receipt 1216, check that it matches the identity hash 1502 obtained by the proxy contract 1600, and indicate to the external entity 1608 whether they have been determined to match. For example, the original receipt may only be released if it is determined to match the identity hash 1520, and hence verified as representing the "true" identity corresponding to the identity hash 1520.

Figure 17:
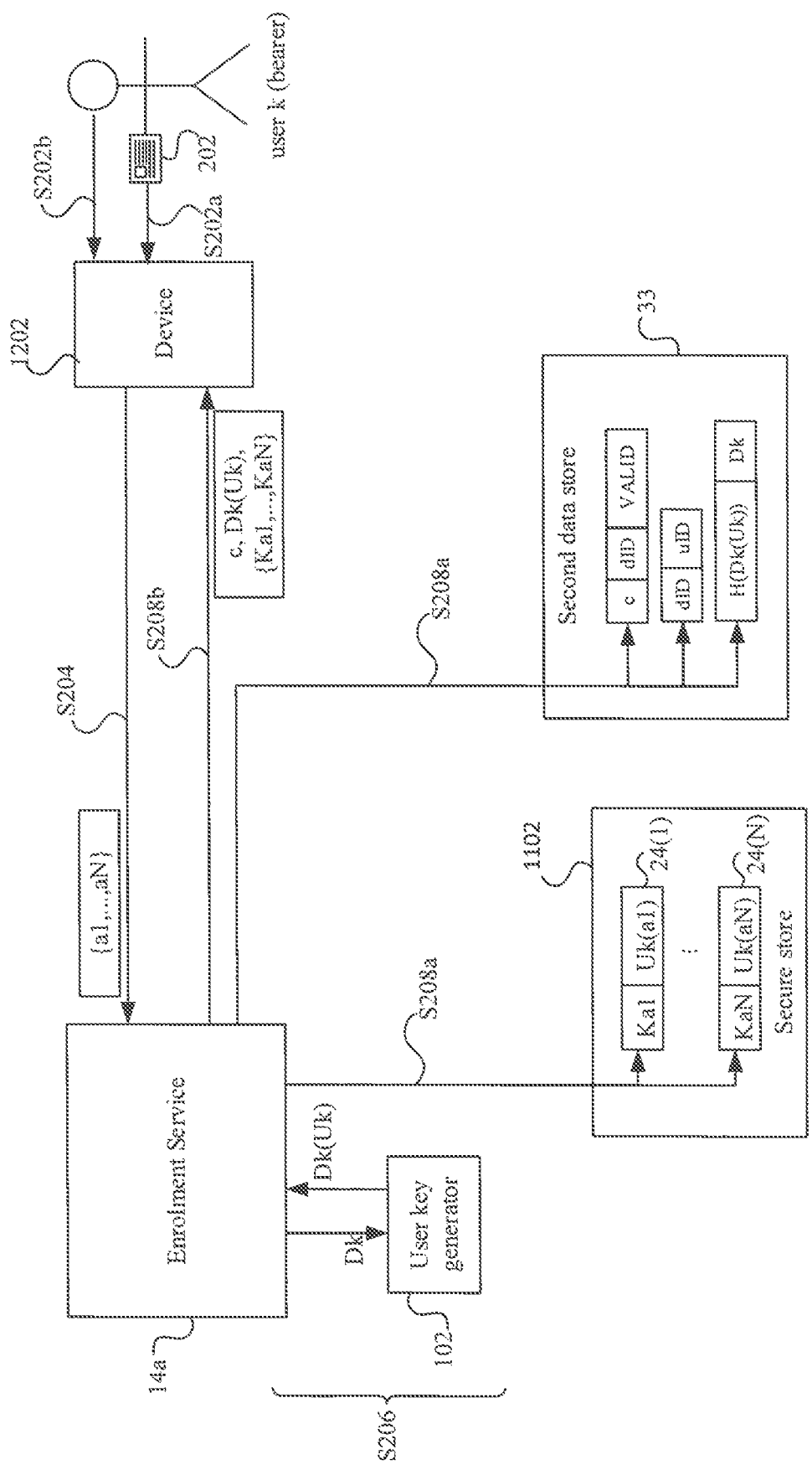
FIG. 17 shows a signalling diagram for an enrolment process.

FIG. 17 shows an example method by which a user of a device can create a digital identity for himself within the digital identity system 1.

At step S202a, the user uses his device 1202 to capture a set of N attributes {a2, . . . , aN}, where N≥1, from an identity document 202, such as a passport, driving license, national identity document etc. These may for example be captured using a camera of the device 14 or from an NFC chip embedded in the document, or a combination of both. At step S202b, the user captures using the camera of the device 1202 an image of his face, i.e. his selfie, which is also an attribute of the user denoted a1 by convention herein.

At step S204, the user transmits to the enrolment service 14a of the digital identity system 1 an electronic identity creation request comprising the set of attributes {a1, a2, . . . , aN}, denoted {a} for convenience below. That is, the selfie a1 and the additional attribute(s) captured from the document 202.

In response to the enrolment request, the enrolment service 14a generates (S206) a user key Uk for the user. The user key Uk is encrypted with a device key Dk for the device 1202, wherein Dk(Uk) denotes a version of Uk encrypted with Dk. To generate the user key Uk, the enrolment service 14a inputs the device key Dk to the user key generator 102. To provide optimum security, the user key generator 102 can be implemented as a dedicated, hardware security model of the system, e.g. in accordance with the FIPS 14-2 standard. In response to receiving the device key Dk, the user key generator 102 generates the user key Uk and outputs only the encrypted version of it Dk(Uk) to the enrolment service 14a. The unencrypted version Uk is never rendered directly accessible by the user key generator 102.

At step S208a, the enrolment service 14a uses the device key Dk to decrypt the encrypted version of the user key Uk, and uses the unencrypted version of the user key Uk to encrypt each of the attributes a1, . . . aN. The user key Uk may be used directly to encrypt the attributes. Alternatively, each attribute may be encrypted with a key unique to that attribute ("Item key/attribute key" Ik); in this case, the item key Ik is unencrypted with the user key Uk. The encrypted item key Uk(Ik) is held in the identity system 1, in a manner such that the user can send a message to the identity system which comprises Dk(Uk) and identifies where a given one of their attributes a is stored, and also where the item key Uk(Ik) for that attribute is stored. The device key Dk is used to decrypt Dk(Uk), Uk is used to decrypt Uk(Ik), and Ik is used to decrypt the identified attribute Ik(a).

Note that them terminology "data encrypted with a key" is not limited to direct encryption of that data with that key, an also covers, for example, a situation where the data is directly encrypted with a different key, and the different key is encrypted directly with that key (among others).

A respective entry 1102(1), . . . , 1102(N) is created in the secure store 1102 for each of the attributes a1, . . . , aN. Each entry is a key-value pair, whose value is the encrypted version of that attribute, denoted Uk(a1), . . . , Uk(aN), and whose database key Ka1, . . . , KaN of is a randomly generated sequence. The database key is needed to locate that key-value pair in the database. Below, {Ka} is used to denote the set of database keys for the set of attributes {a}. Alternatively {Ka} may comprise, for each attribute, the user massage may comprise at least one respective pointer (or other data identifying where the relevant target data is stored). The pointer(s) for that attribute may identity both where the encrypted attribute Ik(a) is held, and where the encrypted item key Uk(Ik) for that attribute is held.

At step S208b, the enrolment service responds to the enrolment request by transmitting an electronic response message to a network address associated with the device 1202. The response comprises the encrypted version of the user key Dk(Uk), the set of database keys {Ka} and a credential c. Once the request has been sent, the set of database keys {Ka} is purged from the digital identity system 1. This means that the entries 21(1), . . . 21(N) are not associated with the user anywhere in the digital identify system 1; the only association that exists between those entries and the user arises by virtue of the fact that the user holds the set of database keys {Ka}.

The credential is a one-time only use credential for the user that is bound to his device 1202 and a user identifier uID of the user. At step S208c, the enrolment service 14a stores in a second data store 33 of the digital identity system 1 an identifier dID of the device 1202, in association with the credential c and a state of the credential. The credential is in a valid state. The state subsequently changes to either "used" or "expired", upon use or if it is not used within a certain duration form its creation. The user uID is also stored in association with the device identifier dID, and is thereby associated in the digital identify system 1 with the credential c. By virtue of these associations, the credential is bound to both the user and the device 1202.

In this example, the user identifier uID comprises image data of the selfie captured at step S202b, which is some embodiments may also be encrypted with the user key Uk. Herein, the term image data of an image (or sequence of images) is used to mean the image itself or selective information extracted from the image(s), such as a local binary pattern (LBP) generated from the image(s) or a set of parameters generated by training a machine learning model (ML) using the image(s) themselves or information extracted from them, e.g. an ML model may be trained using LBPs which have been extracted from the original image(s).

Such selfie image data is one example of what is referred to herein as a biometric template of the user. Alternative biometric templates include image data of a fingerprint image, retinal image, or an image capturing some other suitable biometric feature of the user. In general, the user identifier uID may comprise any such biometric template(s) and/or a non-biometric identifier such as a secret(s) known only to the user. The information embodied in the user identifier uID is voluntarily made available by the enrolling user during enrolment, on the understanding that it is only being stored at the digital identity system 1 to prevent others from being able to gain access to their stored attributes.

The device key Dk itself is also stored in the second store 33, in association with a hash (e.g. HMAC) of Dk(Uk). The hash of an input value means an output value obtained by applying a hash function, such as an HMAC function, to the input value. The advantage of a hash is that it is impossible to recover the original input value from the output value alone. In the present disclosure, this property is exploited by using the hash H(Dk(Uk)) as an index for Dk. This allows Dk to be stored in association with Dk(Uk) without having to store Dk(Uk) at the digital identity system 1 itself (as noted above, Dk(Uk) is held only by the user). This allows Dk to be located when (and only when) the user device subsequently presents Dk(Uk) to the digital identity system, by re-hashing Dk(Uk) and using the result to locate Dk.

The invention claimed is:

1. A method of associating user identity with an autonomous agent embodied on a blockchain stored in a blockchain network, the method comprising the following steps:
    a user engaging in a user authentication process to obtain a set of one or more verified identity attributes of the user;
    computing an identity hash, by applying a hash function to input data comprising the set of verified identity attributes; and
    sending to the blockchain network a data package comprising the identity hash and an identifier of the autonomous agent;
    wherein the autonomous agent is embodied on the blockchain as program code and at least one associated state register for storing associated program state, and wherein the data package causes at least a portion of the autonomous agent's program code to be executed on a node of the blockchain network, which upon execution stores the identity hash in the at least one state register of the autonomous agent.

2. A method according to claim 1, wherein the input data to which the hash function is applied also comprises data the autonomous agent.

3. A method according to claim 2, wherein the data of the autonomous agent is a hash of the program code or other data of the program code, or the identifier of the blockchain agent.

4. A method according to claim 1, wherein the input data to which the hash function is applied also comprises details of the user authentication process.

5. A method according to claim 1, wherein the input data to which the hash function is applied also comprises an identifier of an issuer from which the set of verified identity attributes is obtained.

6. A method according to claim 1, wherein the user authentication process comprises a biometric user authentication process.

7. A method according to claim 6, wherein the set of verified identity attributes comprises a biometric attribute and the biometric user authentication process comprises comparing a captured biometric with the biometric attribute.

8. A method according to claim 1, wherein the set of verified identity attributes is obtained from a digital identity system by transmitting to the digital identity system from a user device operated by the user an electronic message comprising at least one of: at least one attribute key for locating the set of verified identity attributes in a database, and at least one decryption key for decrypting the set of verified identity attributes.

9. A method according to claim 8, wherein the message comprises a credential bound to the user device, wherein the credential is validated at the digital identity system and the set of verified identity attributes are released in response to determining that the credential is valid.

10. A method according to claim 8, wherein the user authentication process comprises a biometric user authentication process, wherein the set of verified identity attributes comprises a biometric attribute and the biometric user authentication process comprises comparing a captured biometric with the biometric attribute, and wherein the electronic message comprises the captured biometric for comparing with the biometric attribute at the digital identity system.

11. A method according to claim 8, wherein the user authentication process comprises a local authentication process performed at the user device, in order to unlock an identity application for instigating the electronic message.

12. A method according to claim 1, wherein the set of verified identity attributes have been verified based on an anchoring document.

13. A method according to claim 8, wherein the digital identity system generates in response to the electronic message a receipt comprising or indicating the set of verified identity attributes.

14. A method according to claim 13, wherein the electronic message comprises an identifier of another user device of another user, and the receipt is transmitted to the other user device.

15. A method according to claim 14, wherein the identifier of the other user is a token captured at the user device, the token being associated with the other user device at the digital identity system.

16. A method according to claim 1, wherein the input data is stored in a secure identity container having an address bound to the identity hash, wherein, upon presentation of the identity hash to a hash proxy, the hash proxy requests the input data to be released to an external device from the identity container.

17. A method according to claim 16, wherein the input data is only released to the external device in response to an authorization message received from a user device associated with the identity container, wherein a hash of the input data to be released is computed therefrom and compared with the identity hash to check that it matches the identity hash.

18. A method according to claim 1, wherein the identifier of the autonomous agent is an address of the autonomous agent.

19. A computer system for associating user identity with an autonomous agent embodied on a blockchain stored in a blockchain network, the computer system including one or more hardware processors configured to:
  effect a user authentication process by which a set of one or more verified identity attributes of a user is obtained;
  compute an identity hash, by applying a hash function to input data comprising the set of verified identity attributes; and
  send to a blockchain network a data package comprising the identity hash and an identifier of the autonomous agent, wherein the autonomous agent is embodied on the blockchain as program code and at least one associated state register for storing associated program state, and wherein the data package causes at least a portion of the autonomous agent's program code to be executed on a node of the blockchain network, which upon execution stores the identity hash in the at least one state register of the autonomous agent.

20. One or more non-transitory computer-readable storage media comprising computer executable instructions for associating user identity with an autonomous agent embodied on a blockchain stored in a blockchain network, wherein the computer executable instructions when executed on one or more processors cause the one or more processors to:
  effect a user authentication process by which a set of one or more verified identity attributes of a user is obtained;
  compute an identity hash, by applying a hash function to input data comprising the set of verified identity attributes; and
  send to a blockchain network a data package comprising the identity hash and an identifier of the autonomous agent, wherein the autonomous agent is embodied on the blockchain as program code and at least one associated state register for storing associated program state, and wherein the data package causes at least a portion of the autonomous agent's program code to be executed on a node of the blockchain network, which upon execution stores the identity hash in the at least one state register of the autonomous agent.

* * * * *